March 7, 1967
A. SCHMIDT, JR
3,308,368
SIX-PHASE RECTIFIER WHEREIN THE INPUT
EVEN HARMONICS ARE ELIMINATED
Filed June 18, 1963
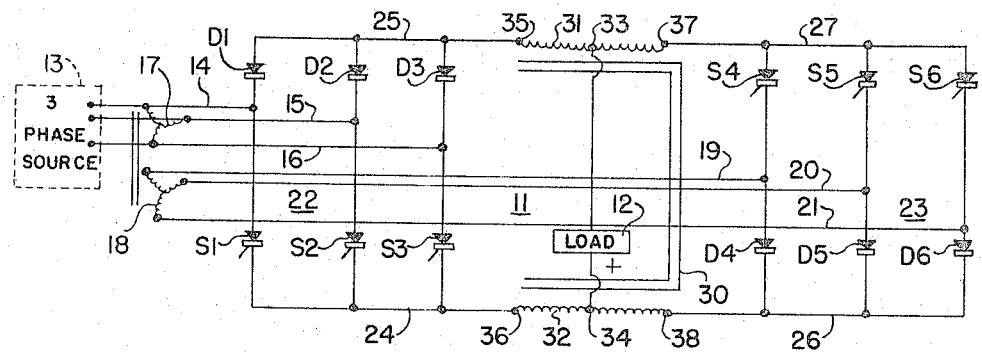
FIG.1
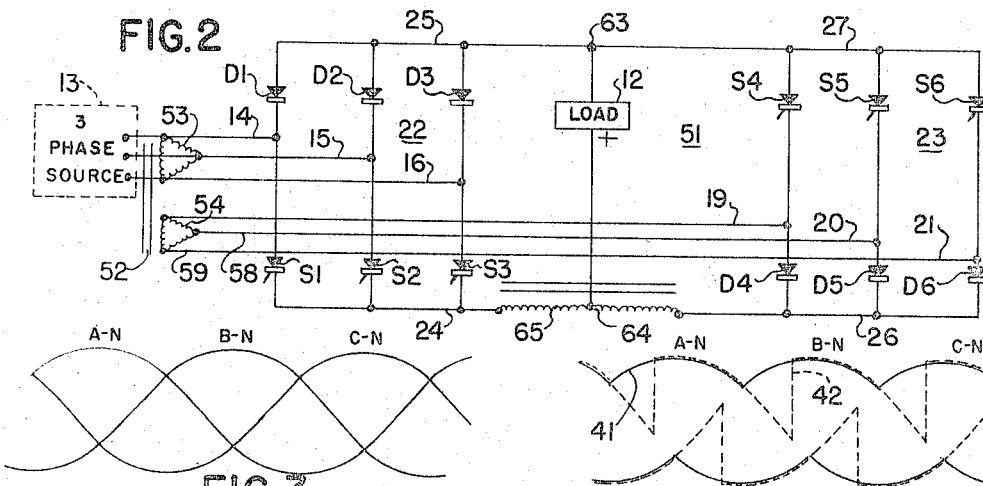
FIG.2
FIG.3
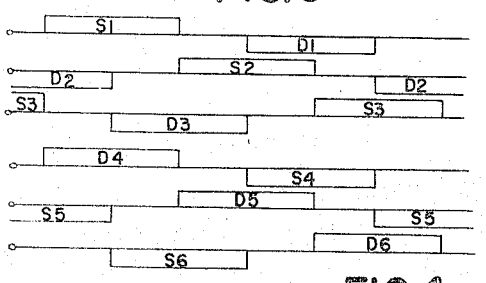
FIG.4
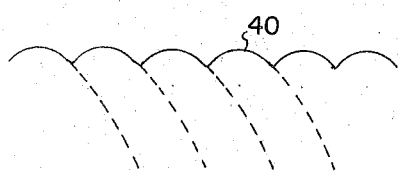
FIG.5
FIG.6
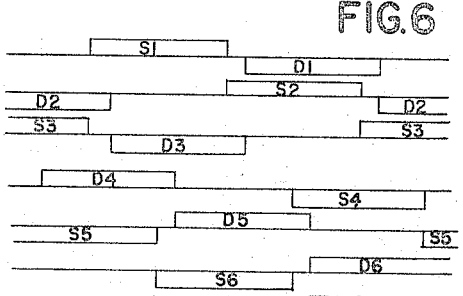
FIG.7
FIG.8
INVENTOR.
AUGUST SCHMIDT JR.
BY *Woodling, Krost,*
*Granger and Rust*
ATTORNEYS United States Patent Office 3,308,368
Patented Mar. 7, 1967

3,308,368
SIX-PHASE RECTIFIER WHEREIN THE INPUT EVEN HARMONICS ARE ELIMINATED
August Schmidt, Jr., Cuba, N.Y., assignor to Acme Electric Corporation, a corporation of New York
Filed June 18, 1963, Ser. No. 288,663
11 Claims. (Cl. 321—9)

The invention relates in general to polyphase rectifier systems and, more particularly, to a six-phase rectifier system which has a six-phase output yet retains many of the economies of a three-phase rectifier system.

Three-phase rectifier systems which are controllable may be of the type which are called a three-phase bridge rectifier in which three of the rectifiers are controlled and three are uncontrolled. This is more economical than using six controlled rectifiers but has two inherent disadvantages. The first is that the output voltage contains a large third harmonic content which is more difficult to filter than the third harmonic content of a six-phase rectifier. The second disadvantage is that the input current has a large even harmonic content. This is much more objectionable in power systems than the odd harmonic content associated with conventional circuits and with larger power levels in the order of 100 kilowatts or more can be seriously objectionable on the power supply. It is also objectionable at lower wattage ratings if the rectifier represents more than about five to ten percent of the kva. rating of the voltage source. These even harmonics are objectionable because of the effects on motor and generator heating where a generator is used to supply the load and where other motors may be connected to the same generator supply source.

Accordingly, an object of the invention is to provide a polyphase rectifier system which obviates the above disadvantages.

Another object of the present invention is to provide a polyphase rectifier system using first and second groups of rectifiers each being a bridge rectifier group and with both groups supplying a load through inductive means which averages the voltages supplied to the load.

Another object of the present invention is to provide a polyphase rectifier system comprising two groups alternatively supplying a load to provide twice the current pulses to the load as would be provided by one rectifier group alone.

Another object of the present invention is to provide a six-phase rectifier system with first and second groups of three-phase bridge rectifiers supplying a load through an interphase transformer.

Another object of the present invention is to provide a polyphase rectifier system for supplying larger kilowatt loads wherein even harmonics on the input circuits are eliminated.

Another object of the present invention is to provide a polyphase rectifier system for larger kilowatt loads wherein an interphase transformer is used between two rectifier groups to average the voltages of the two groups and with the interphase transformer having three times the frequency of the supply source.

Other objects and a fuller understanding of this invention may be had by referring to the following description and claims, taken in conjunction with the accompanying drawings, in which:

FIGURE 1 is a schematic diagram of a rectifier system embodying the invention;
FIGURE 2 is a schematic diagram of a modification;
FIGURE 3 is a graph of input voltages;
FIGURE 4 is a graph of current flow;
FIGURE 5 is a graph of output voltages;
FIGURE 6 is a graph of input voltages for a different conducting condition;
FIGURE 7 is a graph of current flow; and
FIGURE 8 is a graph of output voltages.

FIGURE 1 shows schematically a polyphase rectifier system 11 embodying the invention. This rectifier system 11 has been shown as a six-phase rectifier system since it supplies a six-phase output voltage to a load 12. The rectifier system 11 operates from a three-phase voltage source 13 having phase conductors 14, 15 and 16. A three phase transformer primary 17 is connected to these phase conductors, and has a secondary 18 feeding another set of phase conductors 19, 20 and 21. The rectifier system 11 includes first and second rectifier groups 22 and 23, respectively, with each being a three-phase bridge rectifier. The first rectifier group 22 includes three controlled rectifiers S1, S2 and S3 and three uncontrolled rectifiers D1, D2 and D3. The controlled rectifiers may be solid state controlled rectifiers such as silicon controlled rectifiers and the uncontrolled rectifiers may be solid state rectifiers such as diodes. Each rectifier has an anode and a cathode and the controlled rectifiers also have a gate. The anodes of the controlled rectifiers S1, S2 and S3 are connected respectively to the conductors 14, 15 and 16. The cathodes of the controlled rectifiers are common and connected to a conductor 24. The cathodes of the uncontrolled rectifiers D1, D2 and D3 are connected respectively to the conductors 14, 15 and 16 and the anodes of these rectifiers are common and connected to a conductor 25.

The second rectifier group 23 includes fourth, fifth and sixth controlled rectifiers S4, S5 and S6, respectively, and fourth, fifth and sixth uncontrolled rectifiers D4, D5 and D6, respectively. The second rectifier group 23 is arranged in transposed relationship to the connection of the first bridge rectifier group 22. The anodes of the uncontrolled rectifiers D4, D5 and D6 are connected respectively to the conductors 19, 20 and 21 and the cathodes of these rectifiers are common and connected to a conductor 26. The cathodes of the controlled rectifiers S4, S5 and S6 are connected respectively to the conductors 19, 20 and 21 and the anodes of these rectifiers are common and connected to a conductor 27.

A single core interphase transformer 30 has first and second windings 31 and 32 with midtaps 33 and 34, respectively. The winding 31 has end terminals 35 and 37 and the winding 32 has end terminals 36 and 38. Conductors 24 and 26 are connected to end terminals 36 and 38, respectively, and conductors 25 and 27 are connected to end terminals 35 and 37, respectively. The load 12 is connected between midtaps 33 and 34 as D.C. output terminals with the midtap 34 being the positive D.C. output terminal.

Operation

FIGURE 3 illustrates the applied phase voltages from the three-phase source 13. The voltages to neutral of phases A, B and C are illustrated. The trigger circuits for the controlled rectifiers S1 through S6 are not illustrated, since they may be conventional circuits. These trigger circuits apply a triggering voltage to the controlled rectifiers in the following sequence: S1, S6, S2, S4, S3 and S5. If phases A, B and C are considered the voltages at the conductors 14, 15 and 16, respectively, then the first combination of rectifiers that may be fired are S1 and D2. Assuming that the controlled rectifiers are phased to fire full-on, S1 may be fired as soon as the voltage on phase A becomes most positive. FIGURE 4 illustrates square wave pulses of currents, disregarding any carryover of current which would be caused by an inductive load. The pulses of current in FIGURE 4 have been labeled with the same designation as the rectifier through which these pulses pass in order to aid ready identification of these current pulses. It will be seen that there are six firing periods during one 360 degree cycle, with the D.C. output voltage 40 as shown in FIGURE 5. In the first period rectifiers S1 and D2 are conducting. The current will flow from conductor 14 through controlled rectifier S1 through the left half of interphase transformer winding 32 from left to right, through the load 12, through the left half of interphase transformer winding 31 from right to left and through rectifier D2 to the conductor 15. The two transformer windings 31 and 32 are on a common core and the two windings 31 and 32 are so wound and so connected that the aforementioned flow of current in each of these two halves of the windings will establish flux in the same direction in the core of these transformers. This means that there will be a voltage drop in both halves of these windings. Accordingly, the input voltage of the source 13 will need to be raised to accommodate this voltage drop but otherwise there are no losses in the interphase transformer 30 other than iron losses. Concurrently, during this first period, there is current conduction through rectifiers D4 and S5. Current flows from conductor 19 through rectifier D4, through the right half of the interphase transformer winding 32 from right to left, through the load 12, through the right half of interphase transformer winding 31 from left to right and through the rectifier S5 to the source conductor 20.

In the second period, rectifiers S1 and D3 will be conducting. This current flow is from conductor 14 through rectifier S1, through the left half of transformer winding 32, through the load 12, through the left half of transformer winding 31 and return to the source conductor 16 through rectifier D3. Also in this second period, rectifiers D4 and S6 are simultaneously conducting. Such current flows from conductor 19 through rectifier D4 through the right half of interphase transformer winding 32 from right to left through the load 12 through the right half of interphase transformer winding 31 from left to right and through controlled rectifier S6 to the source conductor 21.

During the third period, current flows from conductor 15 through rectifier S2 again through the left half of winding 32 through the load 12 through the left half of winding 31 and rectifier D3 to return to the source conductor 16. Also during this third period there is current flow through rectifiers D5 and S6. Such current flow is from conductor 20 through rectifier D5, through the right half of transformer winding 32, through the load 12, through the right half of transformer winding 31 and through rectifier S6 to the conductor 19. During the fourth period, there is current flow through rectifiers D1 and S2 with this current flowing through the left half of windings 31 and 32. Also, during this fourth period, current conduction will be through rectifiers D5 and S4 and through the right half of windings 31 and 32. During the fifth period current conduction will be through rectifiers S3 and D1 and through the left half of windings 31 and 32. Also, during this fifth period there is current conduction through rectifiers S4 and D6 and through the right half of transformer windings 31 and 32. During the sixth period, current will flow through rectifiers D2 and S3 and through the left half of transformer windings 31 and 32. During this sixth period current also will flow through rectifiers D6 and S5 and the right half of windings 31 and 32.

Next, FIGURES 6, 7 and 8 show the condition where the controlled rectifiers S1–S6 are phased back so that they are not completely conductive. In FIGURE 6, the line voltages are again shown and the solid line curve 41 shows the voltages to neutral of the positive and negative diodes D1–D6, while the dotted line curve 42 shows the voltages to neutral of the positive and negative controlled rectifiers S1–S6. FIGURE 7 shows the current pulses again labeled the same as the respective uncontrolled or controlled rectifiers for ease of identification. It will be noted that the curent pulses through the uncontrolled rectifiers D1–D6 are directly in accordance with the solid line curve 41, that is, current through these controlled rectifiers is directly in accordance with the most positive voltage or most negative voltage, respectively, for that particular instant. However, the controlled rectifiers S1 through S6 are phased back to not be fired until about 40 degrees after the most positive point of the anode voltage on that particular controlled rectifier. Thus, the controlled rectifiers may prevent current from flowing in the most positive or most negative transformer winding at a given instant. For instance, the uncontrolled rectifier D4 will find its return path continuing through the controlled rectifier S5 beyond the time when the controlled rectifier S6 becomes more negative than controlled rectifier S5 because controlled rectifier S6 is prevented from firing at that time.

FIGURE 8 shows the instantaneous voltages from the first and second rectifier groups to the negative D.C. terminal. The dotted line curve 43 is a curve of the output voltage supplied by the first rectifier group 22 and the solid line curve 44 is a curve of the output voltage of the second rectifier group 23. At the beginning of this FIGURE 8, a curve 45 is shown which averages these two output voltages 43 and 44 and is the actual D.C. output voltage wave form of the entire rectifier system 11 as applied to the load 12. This output voltage wave form 45 of course occurs throughout the FIGURE 8 but has been omitted from the last portion for clarity in observing the output voltages of the rectifier groups 22 and 23. It will be noted from FIGURE 8 that the output voltage 45 of the rectifier system 11 has only onehalf the amplitude variation of the output voltages 43 and 44. This means less filtering capacity is required. Also, this output voltage 45 is six-phase rather than threephase, again requiring less filtering capacity. Areas 46 have been shaded in FIGURE 8 to illustrate the voltage developed across the interphase transformer 30. This illustrates that the voltage across this transformer 30 is only about 30 percent of the voltage of the source 13. Because of this smaller voltage on the interphase transformer 30 plus the fact that the frequency on the transformer is three times that of the source 13, permits the interphase transformer 30 to have a physical kva. rating of only about 17 percent of the D.C. kilowatt supplied to the load 12.

Since the rectifier groups 22 and 23 are both conducting to supply the load current, the ampere rating of these controlled rectifiers is only half as much for a given load kilowatt rating as would be the case if only a single rectifier group such as group 22 were used to supply the load 12. Also, it will be clear that the diodes or controlled rectifiers may be paralleled if necessary for larger kva. ratings. The cost of the interphase transformer 30 is only about one-tenth that of a three-phase transformer supplying the input voltage because this interphase transformer has only one-sixth the kva. rating and has three times the frequency for a smaller mass of iron.

FIGURE 2 is a modification of the invention wherein the first and second rectifier groups 22 and 23 are used in a rectifier system 51. The rectifier groups 22 and 23 are in transposed relationship as before, however, the second rectifier group 23 is energized through a delta connected transformer 52 having a primary 53 connected to conductors 14–16 and a secondary 54 supplying the conductors 19–21. In this FIGURE 2, conductors 25 and 27 are interconnected at a terminal 63 which is the negative D.C. output terminal. The positive D.C. output terminal 64 is connected to the midtap of an interphase transformer 65 which interconnects conductors 24 and 26.

The rectifier system 51 of FIGURE 2 operates essentially in the same manner as the rectifier system 11 of FIGURE 1. Again, there are six periods of conduction in one 360 degree cycle with 180 cycle current in the interphase transformer 65 and again this transformer 65 is a device to average the voltages of the first and second rectifier groups 22 and 23 even though the instantaneous values of the voltages of these groups are unequal. Because of the transformer 52 current cannot flow in any given instant through an uncontrolled rectifier in the first group plus an uncontrolled rectifier in the second group.

The FIGURE 2 shows that the interphase transformer 30 need not be split into two parts in both the positive and negative leads from the rectifier groups to the load 12. The FIGURE 8 shows that the instantaneous voltages from the negative D.C. terminal of the load to the electrical neutral are not equal, however, the average voltage is equal and hence these two conductors 25 and 27 may be interconnected, as long as some electrical neutral such as the neutral point on the wye connected transformers of FIGURE 1 are not interconnected.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A polyphase rectifier system comprising, in combination, terminal means of polyphase source means,
    first and second polyphase bridge rectifier groups each having an equal number of controllable and uncontrolled rectifier means,
    positive and negative D.C. output terminals,
    inductance means having first and second portions,
    means connecting one of said D.C. output terminals to said inductance means,
    first circuit means including said inductance means first portion and connecting the controllable rectifier means in said first group to conduct current from said terminal means to said positive output terminal and connecting the uncontrolled rectifier means in said first group to conduct current from said negative output terminal to said terminal means,
    and second circuit means including said inductance means second portion and connecting the uncontrolled rectifier means in said second group to conduct current from said terminal means to said positive output terminal and connecting the controllable rectifier means in said second group to conduct current from said negative output terminal to said terminal means.

2. A polyphase rectifier system comprising, in combination, first, second and third phase terminal means of polyphase source means,
    first and second polyphase rectifier groups each having three controlled and three uncontrolled rectifiers,
    positive and negative D.C. output terminals,
    inductance means having a midtap,
    means connecting one of said D.C. output terminals to said midtap,
    first circuit mean including said inductance means and connecting the three controlled rectifiers in said first group to conduct current from said phase terminal means to said positive output terminal and connecting the three uncontrolled rectifiers in said first group to conduct current from said negative output terminal to said phase terminal means,
    and second circuit means including said inductance means and connecting the three uncontrolled rectifiers in the second group to conduct current from said phase terminal means to said positive output terminal and connecting the three controlled rectifiers in said second group to conduct current from said negative output terminal to said phase terminal means.

3. A six phase rectifier system comprising, in combination, first, second and third phase terminal means of three phase source means,
    first and second rectifier groups each having three controlled and three uncontrolled rectifiers,
    the three controlled rectifiers in said first group having the three anodes thereof connected respectively to said first, second and third phase terminal means,
    the three uncontrolled rectifiers in said first group having the three cathodes thereof connected respectively to said first, second and third phase terminal means,
    the three uncontrolled rectifiers in said second group having the three anodes thereof connected respectively to said first, second and third phase terminal means,
    the three controlled rectifiers in said second group having the three cathodes thereof connected respectively to said first, second and third phase terminal means,
    inductance means having winding means with a midtap,
    means including said winding means interconnecting the anodes of said uncontrolled rectifiers in said first group and the anodes of said controlled rectifiers in said second group and also interconnecting the cathodes of said controlled rectifiers in said first group and the cathodes of said uncontrolled rectifiers in said second group of rectifiers,
    D.C. output terminals,
    and means connecting said D.C. output terminals to said maidtap and to one of the said interconnecting means.

4. A six phase rectifier system comprising, in combination, first, second and third phase terminals of a three phase source,
    first and second rectifier groups each having three controlled and three uncontrolled rectifiers,
    the three controlled rectifiers in said first group having the three anodes thereof connected respectively to said first, second and third phase terminals,
    the three uncontrolled rectifiers in said first group having the three cathodes thereof connected respectively to said first, second and third phase terminals,
    the three uncontrolled rectifiers in said second group having the three anodes thereof connected respectively to be energized in accordance with the voltage on said first, second and third phase terminals,
    the three controlled rectifiers in said second group having the three cathodes thereof connected respectively to be energized in accordance with the voltage on said first, second and third phase terminals,
    inductance means having winding means with a midtap,
    means including said winding means interconnecting the anodes of said uncontrolled rectifiers in said first group and the anodes of said controlled rectifiers in said second group and also interconnecting the cathodes of said controlled rectifiers in said first group and the cathodes of said uncontrolled rectifiers in said second group of rectifiers,
    D.C. output terminals,
    and means connecting said D.C. output terminals to said midtap and to one of said interconnecting means.

5. A six phase rectifier system comprising, in combination, first, second and third phase terminal means of three phase source means,
    first and second rectifier groups each having three controlled and three uncontrolled rectifiers,
    the three controlled rectifiers in said first group having a common cathode connection and having the three anodes thereof connected respectively to said first, second and third phase terminal means,
    the three uncontrolled rectifiers in said first group having a common anode connection and having the three cathodes thereof connected respectively to said first, second and third phase terminal means, the three uncontrolled rectifiers in said second group having a common cathode connection and having the anodes thereof connected resspectively to said first, second and third phase terminal means, the three controlled rectifiers in said second group having a common anode connection and having the three cathodes thereof connected respectively to said first, second and third phase terminal means, means interconnecting said common anode connections and interconnecting said common cathode connections of said first and second groups of rectifiers, D.C. output terminals, means connecting said D.C. output terminals to said interconnecting means, and transformer means isolating said first and second groups of rectifiers to prevent current conduction serially through an uncontrolled rectifier in each of said first and second groups of rectifiers.

6. A six phase rectifier system comprising, in combination, first, second and third phase terminal means of three phase source means, first and second rectifier groups each having three controlled and three uncontrolled rectifiers, the three controlled rectifiers in said first group having a common cathode connection and having the three anodes thereof connected respectively to said first, second and third phase terminal means, the three uncontrolled rectifiers in said first group having a common anode connection and having the three cathodes thereof connected respectively to said first, second and third phase terminal means, the three uncontrolled rectifiers in said second group having a common cathode connection and having the three anodes thereof connected respectively to said first, second and third phase terminal means, the three controlled rectifiers in said second group having a common anode connection and having the three cathodes thereof connected respectively to said first, second and third phase terminal means, inductance means having winding means with a midtap, means including said winding means interconnecting said common anode connections and interconnecting said common cathode connections of said first and second groups of rectifiers, D.C. output terminals, and means connecting said D.C. output terminals to said midtap and to one of said common anode and common cathode connections of said first and second groups of rectifiers.

7. A six phase rectifier system comprising, in combination, first and second three phase input transformers each having first, second and third phase terminals, first and second rectifier groups each having three controlled and three uncontrolled rectifiers, the three controlled rectifiers in said first group having a common cathode connection and having the three anodes thereof connected respectively to said first, second and third phase terminals of said first transformer, the three uncontrolled rectifiers in said first group having a common anode connection and having the three cathodes thereof connected respectively to said first, second and third phase terminals of said first transformer, the three uncontrolled rectifiers in said second group having a common cathode connection and having the three anodes thereof connected respectively to said first, second and third phase terminals of said second transformer, the three controlled rectifiers in said second group having a common anode connection and having the three cathodes thereof connected respectively to said first, second and third phase terminals of said second transformer, an interphase inductance having winding means with a midtap, said winding means being connected between the common cathode connections of said first and second groups of rectifiers, and means connecting D.C. output terminals to said midtap and to the common anode connections of said first and second groups of rectifiers.

8. A six phase rectifier system comprising, in combination, first and second three phase source means each having first, second and third phase terminals, first and second rectifier groups each having three controlled and three uncontrolled rectifiers, the three controlled rectifiers in said first group having a common cathode connection and having the three anodes thereof connected respectively to said first, second and third phase terminals of said first source means, the three uncontrolled rectifiers in said first group having a common anode connection and having the three cathodes thereof connected respectively to said first, second and third phase terminals of said first source means, the three uncontrolled rectifiers in said second group having a common cathode connection and having the three anodes thereof connected respectively to said first, second and third phase terminals of said second source means, the three controlled rectifiers in said second group having a common anode connection and having the three cathodes thereof connected respectively to said first, second and third phase terminals of said second source means, an interphase inductance having winding means with a midtap, means including said winding means interconnecting said common anode connections and interconnecting said common cathode connections of said first and second groups of rectifiers, and D.C. output terminals connected to said midtap and to said interconnecting means.

9. A six phase rectifier system comprising, in combination, three phase source means having first, second and third phase terminal means, first and second rectifier groups each having three controlled and three uncontrolled rectifiers, the three controlled rectifiers in said first group having a common cathode connection and having the three anodes thereof connected respectively to said first, second and third phase terminal means, the three uncontrolled rectifiers in said first group having a common anode connection and having the three cathodes thereof connected respectively to said first, second and third phase terminal means, the three uncontrolled rectifiers in said second group having a common cathode connection and having the three anodes thereof connected respectively to said first, second and third phase terminal means, the three controlled rectifiers in said second group having a common anode connection and having the three cathodes thereof connected respectively to said first, second and third phase terminal means, an interphase transformer having winding means with a midtap, said winding means being connected between the common cathode connections of said first and second groups of rectifiers, and means connecting D.C. output terminals to said midtap and to the common anode connections of said first and second groups of rectifiers.

10. A six phase rectifier system comprising, in combination, first and second three phase transformers each having three terminals and energizable from a common polyphase source, first and second rectifier groups each having three controlled and three uncontrolled rectifiers, the three controlled rectifiers in the first group having a common cathode connection and having the three anodes thereof connected respectively to the three terminals of said first transformer, the three uncontrolled rectifiers in the first group having a common anodes connection and having the three cathodes thereof connected to the three terminals of said first transformer, the three uncontrolled rectifiers in the second group having a common cathode connection and having the three anodes thereof connected to the three terminals of said second transformer, the three controlled rectifiers in the second group having a common anode connection and having the three cathodes thereof connected to the three terminals of said second transformer, an interphase transformer having first and second windings each with a midtap, the two midtaps being the D.C. output terminals of said rectifier system, said first winding being connected between the common anode connections of said first and second groups of rectifiers, and said second winding being connected between the common cathode connections of said first and second groups of retcifiers.

11. A six phase rectifier system comprising, in combination, first and second three phase transformers each having three terminals and energizable from a common polyphase source, first and second rectifier groups each having three controlled and three uncontrolled rectifiers, the three controller rectifiers in the first group having a common cathode connection and having the three anodes thereof connected respectively to the three terminals of said first transformer, the three uncontrolled rectifiers in the first group having a common anode connection and having the three cathodes thereof connected to the three terminals of said first transformer, the three uncontrolled rectifiers in the second group having a common cathode connection and having the three anodes thereof connected to the three terminals of said second transformer, the three controlled rectifiers in the second group having a common anode connection and having the three cathodes thereof connected to the three terminals of said second transformer, an interphase transformer having a winding with a midtap, said winding being connected between the common cathode connections of said first and second groups of rectifiers, a conductor interconnecting said common anode connections of said first and second groups of rectifiers, and first and second D.C. output terminals connected respectively to said conductor and to said midtap.

References Cited by the Examiner

UNITED STATES PATENTS

| | | | |
|---|---|---|---|
| 1,872,009 | 8/1932 | Robinson | 321—26 |
| 2,925,545 | 2/1960 | Fischer | 318—345 |
| 3,026,467 | 3/1962 | Barnes | 321—26 |
| 3,036,258 | 5/1962 | Friedrich | 321—5 |
| 3,113,259 | 12/1963 | Walker | 321—34 |

OTHER REFERENCES

General Electric Controlled Rectifier Manual; pages 103–105 relied upon; first edition; March 20, 1960.

JOHN F. COUCH, *Primary Examiner*.

G. GOLDBERG, *Assistant Examiner*.